Nov. 15, 1927.　　　　　　　　　　　　　　　　　1,649,611
C. McPHERSON
POWER TRANSMITTING DEVICE
Filed Sept. 2, 1924
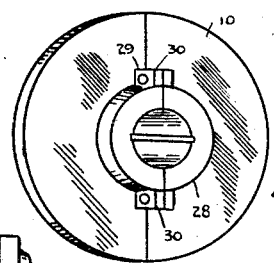
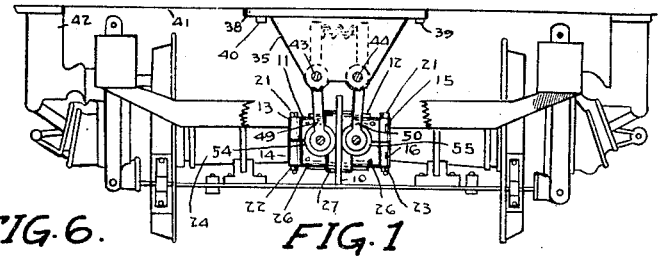
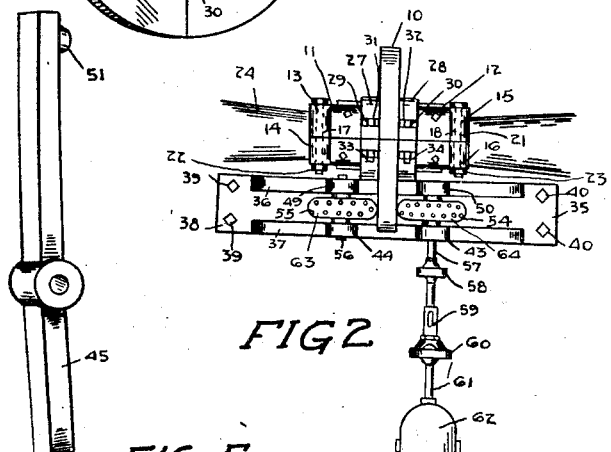
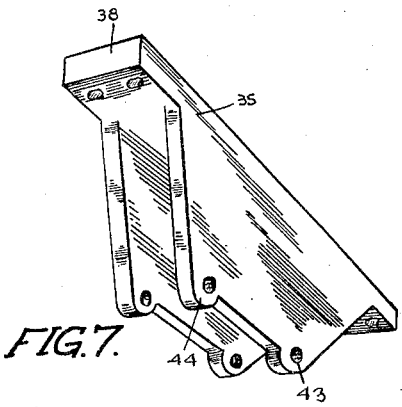
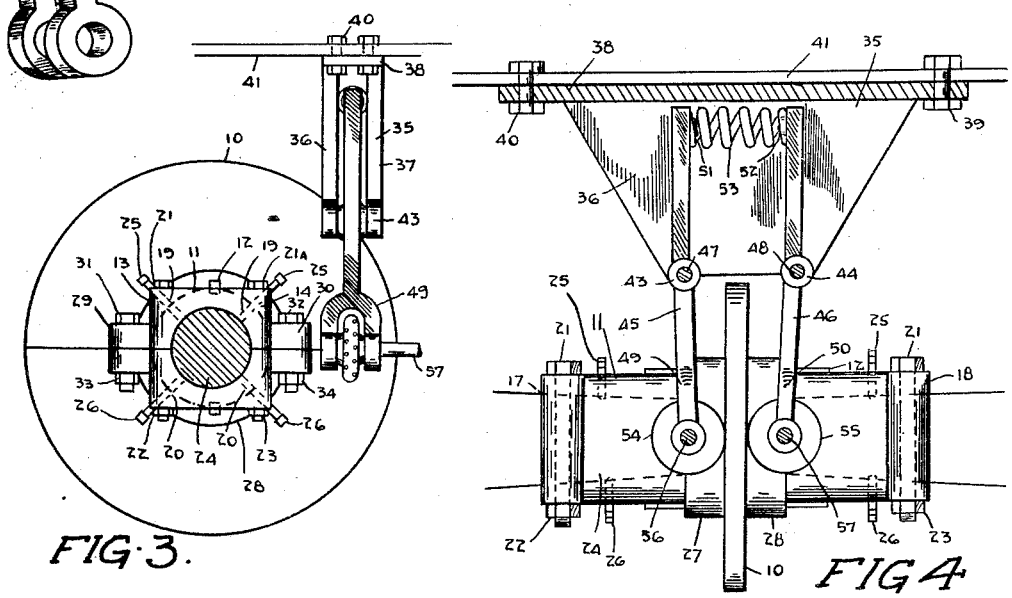
INVENTOR
C. McPherson
By E.J. Fetherstonhaugh
ATTORNEY Patented Nov. 15, 1927.

1,649,611

UNITED STATES PATENT OFFICE.

CHARLES McPHERSON, OF MONTREAL, QUEBEC, CANADA, ASSIGNOR, BY MESNE ASSIGNMENTS, TO FRICTION POWER CORPORATION LIMITED, OF MONTREAL, QUEBEC, CANADA.

POWER-TRANSMITTING DEVICE.

Application filed September 2, 1924. Serial No. 735,352.

The invention relates to a power transmitting device, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to facilitate the transmission of power from a rotating member, whereby the position of the latter is in no wise affected by the pressure of the driven member, to convey the force required to operate machines of various kinds and for many different purposes, without effecting elaborate changes in the mechanism involved; to reduce the cost of maintenance in numerous machinery equipment such as train lighting apparatus, farm machine plants, air compressors, speedometer transmissions and other places, where economical and constant driving are salient features; to eliminate belting and the use of toothed gears in driving mechanical and electrical devices established in positions in which exposure and vibration are always or at frequent intervals present; and generally to provide in all members of the transmission durability and efficiency and simplicity and economy in regard to repairs and replacements.

In the drawings, Figure 1 is a rear elevation showing one practical application of the invention including various parts of the truck and axle upon which the invention is mounted.

Figure 2 is a plan view of the invention showing the same application of the transmission.

Figure 3 is a side elevation of the invention, showing the shaft or axle mounting.

Figure 4 is an enlarged rear elevational view of the invention.

Figure 5 is a detail of a rocker arm.

Figure 6 is a detail of a disk.

Figure 7 is a detail of the bracket.

Like numerals of reference indicate corresponding parts in the various figures.

Referring to the drawings, the driving disk 10 may or may not be split according to the conditions of use, but in the drawings it is shown in two parts mounted and secured non-rotatively on the collar 11 which is also illustrated as of split form with the key 12 forming a slide therealong for the disk correspondingly slotted.

In order to insure a clear sliding way for the disk 10 on the collar 11 the latter is formed with the flange projections 13 and 14 from one half and the flange projections 15 and 16 from the other half.

The flanges 13 and 14 and 15 and 16 are rigidly secured to one another through the bolt holes 17 and 18 by the bolts 21 secured by the nuts 22 and 23 which the set screws 25 and 26 inserted in the screw holes 19 and 20 respectively firmly lock the collars from slip rotatively and otherwise on the axle or shaft 24.

The disk 10 in the construction illustrated is shown as formed with the hub parts 27 and 28 from which the lugs 29 and 30 project respectively and through these lugs the bolts 31 and 32 are inserted to hold the disk on its slide these bolts being held by the nuts 33 and 34.

In the application of the invention as illustrated the bearing bracket 35 is shown as a hanger, but this bracket may be constructed differently and made to suit the conditions under which it is used.

In the present form the parallel flanges 36 and 37 extend right angularly from the base plate 38 and is secured by the bolts 39 and nuts 40 to a bar 41, which may be part of a truck frame 42. The flanges 36 and 37 at their lower ends form the pivot bearings 43 and 44 and the rocker arms 45 and 46 are journalled respectively in these bearings by means of the pivot pins 47 and 48, which are suitably secured.

The rocker arms 45 extend from the pivots and at the ends of the bearing sections are forked to form the pivot bearings 49 and 50.

The lever sections of the rocker arms 45 and 46 have the pins or bosses 51 and 52 in opposed positions adjacent to the ends and these pins or bosses carry the spring 53, which holds the lever sections apart and consequently brings the forked sections towards one another, naturally the spring may be arranged in many other ways and further other resilient means may be used, such as rubber or pneumatic cushions without departing from the spirit of the invention, but springs are generally more serviceable in friction driving mechanism.

The friction wheels 54 and 55 are mounted on the shafts 56 and 57 respectively and these shafts are journalled in the bearings 49 and 50 in the forked sections of the rocker arms 45 and 46, the wheel 54 engaging the disk 10 on the other side, being maintained in close engagement therewith by the spring 53, which is bound to exert even pressure so that there will be no tendency on the part of the disk to move the disk on its sliding seat and yet it may move through vibration or outside force and in doing so, it will of course move the friction wheels with it, and these wheels will subsequently centralize said disk on its seat.

The power may be taken from either the shaft 56 or the shaft 57 or from both and in order to explain the invention in an understandable manner, a universal joint 58 and slip shaft 59 are shown as connecting the shaft 57 through a universal joint 60 to an armature shaft 61 extending from the dynamo 62 which is in train lighting frequently supported from the body of the car, though these parts are only incidental to this invention and not part of it.

The friction wheels 54 and 55 are preferably fitted with rubber tires 63 and 64, these tires may have vacuum recesses 65 and 66, but these details are by no means essential for the wheels can be rimmed and tired with any suitable material.

In the operation of this invention the rotating member is driven by any suitable power usually emanating from a motor or engine and this rotating member may in some instances replace the disk, but the latter is as a general rule an essential feature, especially in efficient operation and in replacement certainly its equivalent must be used to carry out the objects of the invention.

The driven rotating member in turn drives the disk and as the friction wheels are in close engagement with the said disk from either side, these wheels are driven also and turn the shafts they are mounted on and from these shafts or either one of them the power is taken by means of a flexible connection to the machine to be operated.

Any vibration of the shaft, axle or other form of rotating member will always be instantly communicated to the disk, which will move sympathetically along the shaft and carry with it the friction wheels, that hug it closely no matter how many movements it may make on its sliding seat meanwhile the rotation of the disk will be regularly maintained thereby keeping the drive constant which is so important in many equipments.

What I claim is:—

1. In the transmission of power, a driving disk adapted to be slidably mounted on a rotating shaft and having a movement parallel to the axis of rotation, a bearing bracket secured to a member stationary in relation to said shaft, rocker arms pivoted in said bracket and having forked outer ends forming pivot bearings, shafts pivoted in said forked ends, friction wheels mounted on said shafts, and a helical spring holding the upper ends of said rocker arms apart and the friction wheels to their engagement with opposite faces of the disk.

2. In the transmission of power, a driving disk adapted to be slidably mounted on a rotating member and having a movement parallel to the axis of rotation, a bearing bracket secured to a machine frame, rocker arms pivoted in said bracket and having forked pivot bearings at one end and pin projections at the other ends, shafts journalled in said forked ends, friction wheels mounted on said shafts engaging opposite sides of the disk and a helical spring mounted on said pin projections and holding the inner ends of said rocker arms apart and the friction wheels to their engagement with said disk.

3. In the transmission of power, a driving disk adapted to be slidably mounted on a rotating member and having a movement parallel to the axis of rotation, a hanger forming a bearing bracket and having a base adapted to be secured to a bar and parallel plates projecting from said base with bearings at the lower end, rocker arms pivoted in said bracket and having forked pivot bearings at one end and pin projections at the other ends, shafts journalled in said forked ends, friction wheels mounted on said shafts and engaging opposite sides of the disk, and a helical spring mounted on said pin projections and holding the ends of said rocker arms apart and the friction wheels to their engagement with said disk.

4. In the transmission of power, a rotatable shaft, a driving disk in halves having hub portions suitably secured together, a collar in halves having lateral flanges bolted together and set screw holes and set screws therein securing said collar to the said shaft, a seat on said collar for said disk and forming a slideway and a pair of friction wheels one on each side of said disk and journalled in bearings supported from a non-rotative part and spring held to the opposite faces of the disk respectively.

5. A power transmission device, comprising a car axle, a split collar having flanges and bolts securing it to the axle, a disk seat on said collar, a split disk having hub portions and lug bolts securing said disk on the collar to a sliding fit, a hanger forming a bearing bracket and secured to a truck bar, rocker arms pivoted in said hanger, a helical spring holding the upper ends of said arms apart, friction wheels on shafts journalled at the lower ends of said rocker arms and having one shaft extending beyond the hanger and flexible connections to the machine to be driven.

6. In a power transmitting device spring-held friction rollers, roller shafts, a disk grasped between said friction rollers and coacting therewith, a main shaft for said disk and bearings therefor, a self aligning member formed of arms pivotally swung from pivot bearings individual to each arm and spaced and carrying bearings for said roller shafts and adapted to maintain the rollers constantly in direct and parallel alignment through the disk from centre to centre notwithstanding any variation automatically occurring in regard to the relative positions of the coacting gear members and their supports and a member forming a gliding way for one of the gear units adapted to adjust the gears to their central position following their varying relative positions.

7. In a power transmitting device, a friction gearing comprising coacting members, an axle on wheels adapted to rotate therewith and forming a support, a friction disk mounted on said axle and forming one coacting member, a truck frame having bearings for said axle, rocker arms journalled in separated bearings and spring-held and having friction wheel shaft bearings, a bracket hung from the truck end and having spaced pivot bearings for said arms, friction wheels forming the coacting members on either side of said friction gear and a gear support having a sliding mechanism introduced in the mounting of one of said gears and maintaining the coacting members in operative relationship notwithstanding the varying lateral movements of said truck and axle.

8. In a power transmitting device, an axle a truck frame moving independently in relation to said axle and having bearings therefor, a disk mounted on said axle and rotated thereby, rocker arms supported intermediately by spaced pivot bearings and spring-held, a bracket extending from said truck frame and having separate pivot bearings for said arms, said arms being held apart at the other ends, a pair of rollers and shafts rotated thereby and journalled in pivot bearings at the ends of said rocker arms and engaging said disk on either side, and a gear support forming a self adjusting mounting introduced in one of the supports of the gear units.

9. In a power transmitting device, a rotatable shaft suitably journalled and driven, a disk mounting rigidly secured on said shaft and forming a sliding way for a disk, a friction disk slidably arranged on said mounting and rotatable therewith, a bracket supported independently of said shaft and in proximity thereto, a pair of rocker arms pivotally and separately mounted in said bracket and having bearings at the outer ends and spring-held at the other ends and friction wheels mounted in said bearings engaging said disk on either side respectively in a balanced pressure and adapted to bring said disk back to a central position following each lateral movement on its mounting.

10. In a power transmitting device, a rotatable shaft suitably journalled and driven, a sleeve rigidly secured to said shaft and forming a slideway and a disk mounting, a disk keyed to said sleeve and laterally movable, a frame supporting bearings for said shaft, a bracket fixedly secured to said frame above said shaft and having separated pivot bearings, a pair of rocker arms respectively mounted on said pivot bearings and having friction wheel bearings at the outer ends and spring-held apart at the other ends, and friction wheels mounted on said bearings at the ends of the arms and engaging the disk on opposite sides at equal pressures and adapted to normally hold the disk in its central position.

Signed at Montreal, Canada, this 28th day of August, 1924.

CHARLES McPHERSON.